Patented Apr. 5, 1949

2,466,212

UNITED STATES PATENT OFFICE 2,466,212

POLYMERIZATION OF CONJUGATED DIOLEFINS AND VINYL COMPOUNDS

Joseph D. Danforth, Downers Grove, Ill., assignor to Universal Oil Products Company, Chicago, Ill., a corporation of Delaware No Drawing. Application February 28, 1945,
Serial No. 580,291

8 Claims. (Cl. 260—86.5)

This invention relates to an improved process for polymerizing unsaturated compounds. More specifically, it relates to the production of synthetic elastomers in the presence of improved dispersing agents.

An object of this invention is to manufacture polymers and mixed polymers from diolefinic and vinyl compounds.

Another object of this invention is to form synthetic elastomers in the presence of a wetting and emulsifying agent free from alkali metal soaps of fatty acids.

One specific embodiment of this invention relates to a process for manufacturing a polymer which comprises reacting a conjugated diolefin and a vinyl compound in aqueous emulsion at polymerizing conditions in the presence of an emulsifying and wetting agent comprising an alkylene oxide derivative of a hexitol anhydride partial long chain fatty acid ester.

A further embodiment of this invention relates to a process for manufacturing a synthetic elastomer which comprises reacting at least one member of the group consisting of a conjugated diolefin and a vinyl compound at polymerizing conditions in aqueous emulsion and in the presence of a fatty acid ester of a poly-alkylene oxide derivative of sorbitan.

A still further embodiment of this invention relates to a process for manufacturing a synthetic elastomer which comprises reacting at least one member of the group consisting of a conjugated diolefin and a vinyl compound at polymerizing conditions in aqueous emulsion and in the presence of a mixture of a fatty acid ester of a poly-alkylene oxide derivative of sorbitan and a long chain fatty acid partial ester of sorbitan.

The process of my invention is particularly applicable to the production of synthetic polymers utilizable as synthetic elastomers by forming mixed polymers or interpolymers from conjugated olefinic hydrocarbons and vinyl compounds. The mentioned conjugated diolefinic hydrocarbons include butadiene-1,3, isoprene, and other aliphatic conjugated diolefins of higher molecular weights. Vinyl compounds which may be polymerized together with the diolefinic hydrocarbons include a vinyl halide such as vinyl chloride or vinyl bromide; a vinyl cyanide which is sometimes referred to as acrylonitrile; and a vinyl aromatic hydrocarbon including vinyl benzene such as styrene, α-methyl styrene, etc., and other vinyl aromatic hydrocarbons.

Instead of the pure conjugated diolefinic hydrocarbons or pure vinyl compounds, the cheaper technical raw products or mixtures of a conjugated diolefin with other more saturated hydrocarbons and mixtures of different polymerizable vinyl compounds may be employed in many cases in the presence of the emulsifying agents referred to herein. Thus, butadiene which may represent a typical diolefin utilizable in the process may be utilized from a $C_4$ hydrocarbon fraction containing also certain amounts of butanes and butenes. Similarly, styrene may be in admixture with ethyl benzene since the latter hydrocarbon may be dehydrogenated incompletely in the process used for producing styrene from ethyl benzene.

The emulsifying and wetting agents utilizable in my process comprise fatty acid esters of alkylene oxide derivatives of polyhydric alcohols or ether alcohols, said alcohols including sorbitans, sorbides, mannitans, mannides, and pentaerythritol; and also ethers formed by etherification of a poly-alkylene oxide such as poly-ethylene oxide with an alcohol having at least ten carbon atoms per molecule. Thus, each molecule of my emulsifying and wetting agent has a hydrophilic portion which comprises a poly-alkylene oxide or a poly-alkylene oxide derivative which is soluble in or dispersible in water and a hydrophobic portion comprising at least one oil-soluble hydrocarbon group of at least ten carbon atoms. The hydrophobic group may comprise a long chain fatty acid which may be esterified with one or more of the free hydroxyl groups present in the hydrophilic portion of the molecule, or it may comprise an aliphatic alcohol containing at least ten carbon atoms, said alcohol having been combined with the hydrophilic portion of the molecule by means of an ether linkage. It is preferable, however, to employ as emulsifying agent a material in which the hydrophilic portion of the molecule comprises a poly-alkylene oxide radical or a derivative of poly-ethylene oxide.

Alkylene oxides which are utilizable in producing emulsifying agents of the type referred to herein comprise ethylene oxide and polyethylene oxides, the latter representable by the general formula:

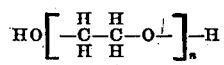

in which $n$ represents an integer of from 2 to about 10 or more. Propylene oxide, polypropylene oxide, and other higher alkylene oxides and polyalkylene oxides are also useful in the production of emulsifying agents suitable for my process.

All of these emulsifying and wetting agents are non-ionic emulsifying agents and accordingly are not particularly sensitive to pH changes in the range of from about 3 to about 10, that is, they function in acidic, neutral, and basic solutions. However, excessive basicity should be avoided in order to prevent saponification of the esters.

The emulsifying and wetting agents employed in my process may be obtained by forming a partial ester from a polyhydric alcohol and a long chain fatty acid containing from about 10 to about 20 carbon atoms per molecule, and also by producing a partial ester from a poly-oxyalkylene derivative of a polyhydric alcohol and a long chain fatty acid containing from about 10 to about 20 carbon atoms per molecule.

The amount of emulsifying agent employed in my process is from about 1 to about 50% by weight based upon the aqueous phase present in the reaction mixture. However, I prefer to employ from about 5 to about 25% by weight of the emulsifying agent. Sometimes a concentration of emulsifying agent of from about 10 to about 40% by weight is used advantageously.

In effecting polymerization to form synthetic elastomers and other polymers as herein described, the polymerizable compounds, particularly diolefinic hydrocarbons and vinyl compounds and a catalyst or polymerization initiator as a peroxide or persalt such as sodium persulfate, potassium persulfate, ammonium persulfate, sodium perborate, sodium percarbonate, etc., are mixed and the polymerization is carried out in the presence of water containing the aforementioned emulsifying and wetting agents. The reaction mixture is maintained at a temperature of from about 50° to about 250° F. and is preferably stirred or mixed by suitable means in order to keep the hydrocarbon mixture and aqueous phase in emulsified condition. Sometimes the polymerization reaction mixture also contains other dispersing agents such as soaps, organic sulfates, organic sulfonates, etc.

Although I do not wish to limit myself to any mechanism or theory to account for the results obtained when employing as emulsifying agent a poly-oxyalkylene derivative of a hexitol anhydride partial long chain fatty acid ester, I have observed that stable emulsions of small droplet size are obtained in the presence of high concentrations of this emulsifying agent. In contrast to this type of emulsion, unstable emulsions of large droplet size were obtained in the presence of soap solutions generally employed heretofore. I believe that the small droplet size and the stability of emulsion contributes materially to the efficient polymerization which I obtain in the presence of these emulsifying and dispersing agents. Also, mixtures of the poly-oxyalkylene derivatives of hexitol anhydride partial long chain fatty acid esters with long chain fatty acid partial esters of hexitol anhydride are also useful as emulsifiers for producing emulsions of small drop size.

Heretofore, soaps in relatively high concentrations have been employed as emulsifying agents in the production of synthetic polymers from diolefinic hydrocarbons and vinyl compounds such as butadiene and styrene. This use of high soap concentrations has several disadvantages. First, many of the soap solutions solidify when an attempt is made to produce a concentrated solution and at the end of the reaction the soap is generally recovered as fatty acid in intimate mixture with the rubber formed in the process. The inclusion of such large amounts of fatty acid in the rubber is impractical since a solvent extraction process would be necessary to recover the fatty acid from the rubber.

In contrast with soap, I have observed that poly-oxyalkylene derivatives of hexitol anhydride partial long chain fatty acid esters are very soluble in water and that solutions of almost any desired concentration can be prepared. Such solutions, for example, of a polyethylene oxide derivative of sorbitan monolaurate are fluid at 60° to 70° F. and are satisfactory dispersing agents in the polymerization of technical mixtures of butadiene and styrene. A profound advantage of my process is due to the fact that emulsifying agents of the type which I employ are soluble in acetone, ethanol, and other organic solvents and that the synthetic polymer is coagulated when the polymer latex is diluted with one or more of these solvents. It is therefore practical to polymerize technical mixtures of diolefinic hydrocarbons and vinyl compounds with an aqueous solution containing a high concentration of the aforementioned emulsifying and wetting agents, coagulate the resultant latex, dissolve the emulsifying agent from the coagulated polymer by the addition of acetone or alcohol so that the emulsifying agent will be soluble in the aqueous phase, and regenerate the original aqueous phase by evaporation of the acetone or alcohol. Thus, the aqueous phase could be recycled and the polymer would be recovered relatively free from contamination by the emulsifying and wetting agent employed.

The following examples are given to illustrate the process of this invention, although with no intention of limiting unduly its generally broad scope.

Example I 2160 ml. of an aqueous phase of pH 8 to 9 containing 20% by weight of poly-oxyalkylene sorbitan mono-oleate, 50 drops of ammonium hydroxide solution and 3 grams of potassium persulfate were mixed in a stainless steel reactor at 70° F. during a period of 20.5 hours with 1185 ml. of a hydrocarbon mixture containing 4.1 mole per cent propylene, 0.5% propane, 36.0% butadiene-1,3, 3.2% isobutylene, 15.0% n-butylenes, 35.0% of butanes, 1.6% of pentanes, and 4.6% of styrene. At the end of this treatment, the reaction mixture was poured into acetone to break the emulsion and 200 grams of butadiene-styrene copolymer was recovered. This yield of copolymer corresponds to 58.5% by weight of the total butadiene and styrene charged. The polymer product coagulated as a white rubber-like mass which was washed with acetone, mixed with 1% of phenyl-$\beta$-naphthylamine, dried, and sheeted on a rolling mill to material resembling crepe rubber.

Example II

In a run similar to that described in Example I, but with a mixture of butadiene, styrene, and petroleum ether, the yield of rubber-like copolymer was 58.6% by weight based upon the total butadiene and styrene charged.

Example III 1060 ml. of an aqueous phase of pH 8 to 9 containing 20% by weight of poly-oxyalkylene sorbitan mono-oleate, 25 drops of ammonium hydroxide solution, and 1.5 grams of potassium persulfate were mixed in a steel autoclave at 70° F. during 21.5 hours with 1190 ml. of a hydrocarbon mixture containing 31.3 mole per cent of butadiene, 5.4 mole per cent of styrene, and 63.3 mole per cent of petroleum ether. This hydrocarbon mixture also contained 17 grams of sorbitan monolaurate. After the reaction, the resultant polymer product was coagulated in acetone, washed, mixed with 1% of phenyl-β-naphthylamine, dried, and worked on the rolling mill to give a sheet of polymer resembling crepe rubber. In this run the yield of rubber-like polymer was 45% based upon the weight of butadiene and styrene charged.

*Example IV*

Several runs were made on the polymerization of technical styrene (35% by weight of styrene in ethyl benzene) in glass reactors in the presence of poly-oxyalkylene sorbitan monolaurate.

The aqueous phase comprises 50 ml. of a poly-oxy-alkylene sorbitan monolaurate solution containing 5 to 40% by weight of this material as designated hereinafter, 6 drops of ammonium hydroxide solution, and 0.05 gram of potassium persulfate catalyst. To this aqueous phase with a pH of 8 to 9 was added 50 ml. of the hydrocarbon mixture containing 35% by volume of styrene in ethyl benzene, the glass reactors were closed, and rotated for 5 hours in a water bath at 110° F. after which the product was coagulated by acetone, washed in acetone, dried and weighed. The yields of polystyrene as a function of the concentration of the emulsifying agent were as follows:

| Weight Per Cent of Polyalkylene Sorbitan Monolaurate in Aqueous Phase | Weight Per Cent of Yield of Polystyrene |
|---|---|
| 5 | 26.4 |
| 15 | 57.2 |
| 25 | 68.5 |
| 40 | 76.0 |

In several runs in the presence of poly-oxyalkylene sorbitan mono-oleate, longer reaction times gave higher yields of polymer when using 20% by weight of the emulsifying agent in water with 0.05 gram of potassium persulfate catalyst and without addition of ammonium hydroxide. In these runs with reaction times of 2, 5, and 19 hours, the polystyrene yields were 0, 28.5, and 96.5%, respectively. In contrast with these results, no detectible amount of polystyrene was obtained after 5 hours in similar runs made in the presence of the same amount of potassium persulfate catalyst and of an aqueous solution containing 3% of potassium palmitate.

*Example V*

15 ml. of styrene, 60 ml. of butadiene, 1 ml. of potassium persulfate solution containing 0.05 gram of potassium persulfate, 6 drops of concentrated ammonium hydroxide solution, and 80 ml. of an aqueous solution containing 20% by weight of poly-oxyalkylene sorbitan monostearate were mixed and charged to each of four stainless steel reactors of 200 ml. capacity. The reaction was then carried out by rotating these tubes in a water bath at 110° F. After 6 hours, one of the tubes was removed from the water bath and the polymer was coagulated in acetone and dried. The polymer obtained was equivalent to 52.5% by weight of the butadiene and styrene charged.

The remaining three tubes containing the reaction mixture was kept at 110° F. for 22 hours and then the polymer was coagulated in acetone, dried, and weighed. The resultant polymer was equivalent to 97.5% by weight of the butadiene and styrene charged.

*Example VI*

70 ml. of liquid butadiene-1,3, 1 ml. of potassium persulfate solution containing 0.05 gram of potassium persulfate, 6 drops of ammonium hydroxide solution and 80 ml. of an aqueous solution containing 20% by weight of poly-oxyalkylene sorbitan monostearate were placed in a stainless steel tube of 200 ml. capacity and rotated at 110° F. for 19 hours. The resultant product was coagulated in acetone, washed, and dried to give a rubber-like material in an amount equivalent to 87.5% by weight of the butadiene charged.

The foregoing specification and examples indicate the character and value of the present process, although it is not intended that either section should limit unduly the generally broad scope of the invention.

I claim as my invention:

1. In the emulsion polymerization of an unsaturated material selected from the group consisting of butadiene-1,3, isoprene, vinyl chloride, vinyl bromide, acrylonitrile, styrene, alpha-methyl styrene, and a mixture of butadiene-1,3 and styrene, wherein the unsaturated material is polymerized while in aqueous emulsion, the improvement which comprises effecting the emulsion polymerization in the presence of an aqueous phase containing from 1 to 50% by weight of a partial ester formed from a fatty acid containing 10 to 20 carbon atoms per molecule and a poly-oxyalkylene derivative of a compound selected from the group consisting of the hexitols and their anhydrides, the poly-oxyalkylene portion of said partial ester being soluble in water.

2. In the emulsion polymerization of an unsaturated material selected from the group consisting of butadiene-1,3, isoprene, vinyl chloride, vinyl bromide, acrylonitrile, styrene, alpha-methyl styrene, and a mixture of butadiene-1,3 and styrene, wherein the unsaturated material is polymerized while in aqueous emulsion, the improvement which comprises effecting the emulsion polymerization in the presence of an aqueous phase containing from 1 to 50% by weight of a partial ester formed from a poly-oxyalkylene derivative of sorbitan and a fatty acid having from 10 to 20 carbon atoms per molecule, the poly-oxyalkylene portion of said partial ester being soluble in water.

3. The process as defined in claim 1 further characterized in that said unsaturated material comprises butadiene-1,3.

4. The process as defined in claim 1 further characterized in that said unsaturated material comprises styrene.

5. The process as defined in claim 1 further characterized in that said unsaturated material comprises butadiene-1,3 and styrene.

6. A process which comprises subjecting butadiene-1,3 to emulsion polymerization in the presence of an aqueous phase containing from 1 to 50% by weight of a partial ester formed from a poly-oxyalkylene derivative of sorbitan and a fatty acid having from 10 to 20 carbon atoms per molecule, the poly-oxyalkylene portion of said partial ester being soluble in water.

7. A process which comprises subjecting styrene to emulsion polymerization in the presence of an aqueous phase containing from 1 to about 50% by weight of a partial ester formed from a poly-oxyalkylene derivative of sorbitan and a fatty acid having from 10 to 20 carbon atoms per molecule, the poly-oxyalkylene portion of said partial ester being soluble in water.

8. A process which comprises subjecting a hydrocarbon mixture containing styrene and butadiene-1,3 to emulsion polymerization in the presence of an aqueous phase containing from 1 to 50% by weight of a partial ester formed from a poly-oxyalkylene derivative of sorbitan and a fatty acid having from 10 to 20 carbon atoms per molecule, the poly-oxyalkylene portion of said partial ester being soluble in water.

JOSEPH D. DANFORTH.

REFERENCES CITED

The following references are of record in the file of this patent:

UNITED STATES PATENTS

| Number | Name | Date |
| --- | --- | --- |
| 1,970,578 | Schoeller et al. | Aug. 21, 1934 |
| 2,211,266 | Gibello | Aug. 13, 1940 |
| 2,222,967 | Wollthan et al. | Nov. 26, 1940 |
| 2,300,056 | Meis et al. | Oct. 27, 1942 |